(No Model.)

R. M. JONES, T. LEGGE, & J. BARTLETT.
Bird Target.

No. 235,251.          Patented Dec. 7, 1880.

Witnesses:
P. C. Dietrich.
Wm. D. Upperman.

Inventors.
Richard Manuel Jones
Thomas Legge
John Bartlett.
Per C. A. Watson & Co. Attorneys.

N. PETERS, PHOTO-LITHOGRAPHER, WASHINGTON, D.C.

UNITED STATES PATENT OFFICE.

RICHARD M. JONES, THOMAS LEGGE, AND JOHN BARTLETT, OF BUXTON, SURREY COUNTY, ENGLAND.

BIRD-TARGET.

SPECIFICATION forming part of Letters Patent No. 235,251, dated December 7, 1880.

Application filed June 30, 1880. (No model.) Patented in England January 22, 1880.

*To all whom it may concern:*

Be it known that we, RICHARD MANSELL JONES, THOMAS LEGGE, and JOHN BARTLETT, subjects of the Queen of Great Britain, residing at Buxton, in the county of Surrey, England, have invented certain new and useful Improvements in Bird-Targets for Gun and Rifle Practice; and we do hereby declare that the following is a full, clear, and exact description of the invention, which will enable others skilled in the art to which it appertains to make and use the same.

This invention has for its object improvements in bird-targets for gun and rifle practice, and is so arranged that it may be fired at either when stationary or in motion.

Figure 1:
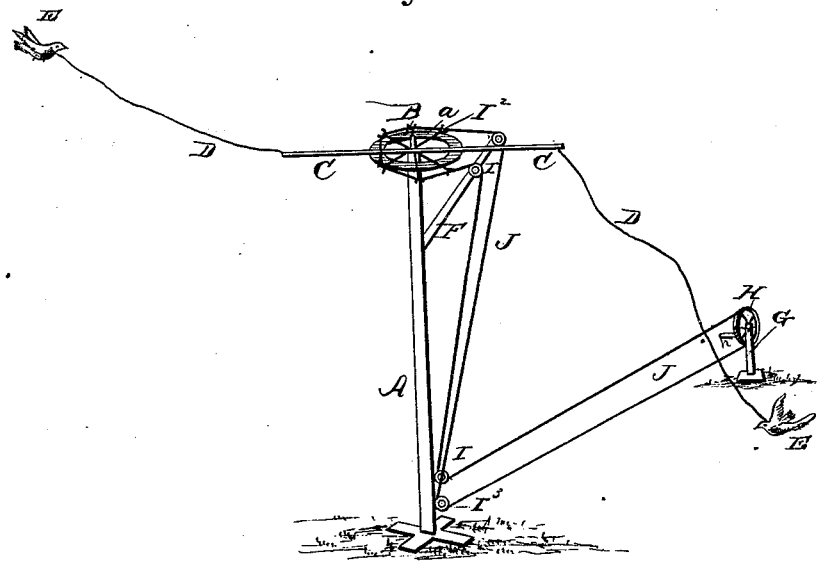
Figure 2:
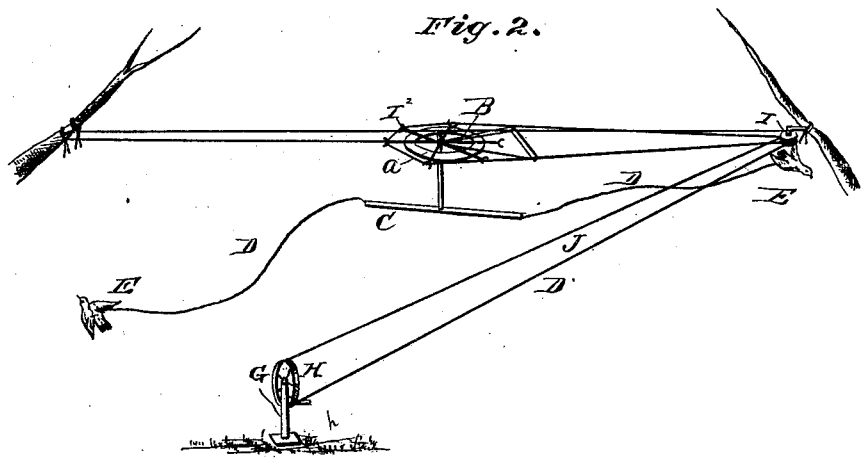

In the accompanying drawings, Figures 1 and 2 are perspective views of our invention, showing different modes of applying the same.

Similar letters refer to similar parts throughout the several views.

A is a vertical pole or support. $a$ is a pin or pivot in the top of pole A. B is a sprocket-wheel. C C are two horizontal arms or bars. D D are two cords or wires attached to the ends of arms C C. E E are the artificial birds or other objects to be aimed or shot at. F is a bar or pole, which is attached diagonally to pole A. G is a pole or support. H is a wheel or pulley. $h$ is a handle on wheel or pulley H. I $I^3$ are small pulleys attached to pole A. $I'$ $I^2$ are small pulleys attached to pole F. J is a cord or wire, which connects wheel H with wheel B by means of the small pulleys I $I'$ $I^2 I^3$.

We construct and operate our device substantially in the following manner: The vertical pole or support A is suitably attached to or fastened in the ground. To the top of pole A is attached a pin or pivot, $a$, upon which the horizontal sprocket-wheel B is suitably attached and made to revolve.

C C are two horizontal arms or bars, which are attached to said sprocket-wheel B. To the outer ends of these said arms or bars are attached cords or wires D D, which carry the artificial birds E E or other objects to be aimed or fired at.

F is a bar or pole of any suitable length, which is attached diagonally to the pole A, and to which the small pulleys $I'$ $I^2$ are attached.

G is a small vertical pole, which is placed at any desired or suitable distance away from the pole A. To this said pole G is attached a wheel or pulley, H. Said wheel is operated by a handle, $h$, which is suitably secured upon it.

I $I^3$ are small pulleys attached to pole A, near its lower end. $I'$ $I^2$ are small pulleys attached to pole F, near its upper end. J is an endless band or wire, which is wound around wheel H, and from thence is carried around the small pulleys I and $I'$, and then around the horizontal wheel B, and from there back to the pulleys $I^2$ and $I^3$, and from thence to the vertical wheel H. When, by turning the handle $h$ on the wheel H, said wheel is made to revolve, it imparts its motion to the sprocket-wheel B by means of the endless band J and the pulleys I $I'$ $I^2$ $I^3$. By thus revolving the sprocket-wheel B, the arms C C, with their cords or wires D D carrying the artificial birds E E or other objects, are put in motion.

The rate of speed at which the objects to be aimed or shot at travel, or the regularity or irregularity of their flight, may be governed by the person operating the handle on the wheel H.

The number of objects to be aimed or fired at may be increased by increasing the number of horizontal arms or bars B and attaching the objects to be aimed or fired at to them in the manner shown.

The wings, heads, and tails of said said artificial birds are made of sheet-iron, and the body of a strong frame-work of wire, resembling the body of a pigeon, in which is inserted an inflated rubber ball or an air-ball, which, by its elasticity, keeps the wings moving on hinges well expanded. The moment the body of the bird is hit, even by a single shot, it splits up, and the ball and wings instantly collapse, the bird loses its balance, and tumbles and whirls in the air exactly like a living bird when shot.

Glass and india-rubber balls, flower-pots, potatoes, or any other suitable object can be attached to the ends of said cords or wires D D.

We do not confine ourselves to this exact construction, as we can suspend the wheel or pulley B with its attendant attachments by means of a wire, rope, or any other suitable material between two trees, as shown in Fig. 2, or in any similar manner, instead of being fixed on a pole, as shown in Fig. 1.

It will readily be seen that this invention will thus afford means for the efficient instruction of marksmen and also for general amusement.

Having thus fully described our invention, what we claim as new, and desire to secure by Letters Patent, is—

1. In a target, the combination of the pole A, having pulleys I and I³, diagonal pole F, carrying the pulleys I' and I², the sprocket-wheel B, horizontal arms C, provided with cords D, carrying the objects to be aimed or shot at, with the pole G, having the wheel H, provided with handles $h$ and endless band or cord J, all constructed and operating substantially as set forth.

2. In a flying target, a revolving bar having attached thereto a flexible cord at one end, to the other end of which cord is attached an artificial bird, in combination with suitable driving mechanism for imparting rotation to said bar, substantially as set forth.

RICHARD MANSELL JONES.
    THOMAS LEGGE.
    JOHN BARTLETT.

Witnesses:
    JULIUS HALL,
    CHARLES EDWARD WALKER.